United States Patent Office 3,770,785
Patented Nov. 6, 1973

3,770,785
BIS(DIALKYLAMINOMETHYL)PHENYLENE-
DIPALLADIUM(II) COMPOUNDS
Swiatoslaw Trofimenko, Newark, Del., assignor to E. I.
du Pont de Nemours and Company, Wilmington, Del.
No Drawing. Continuation-in-part of abandoned application Ser. No. 792,841, Jan. 21, 1969. This application Sept. 24, 1970, Ser. No. 75,233
Int. Cl. C07d 107/00
U.S. Cl. 260—429 R        12 Claims

ABSTRACT OF THE DISCLOSURE

Certain bis(di-lower - alkylaminomethyl)phenylenedipalladium(II) halides (I), e.g., 3,6-bis(diethylaminomethyl)-1,2-phenylenedipalladium(II) dichloride and the corresponding 2,5-, 1,4- isomer, are prepared by reacting a complex inorganic palladium halide with a bis(dialkylamino)xylene, e.g., sodium palladium chloride with $\alpha,\alpha'$-bis(diethylamino)-p-xylene. Compounds I can be converted to novel chelates (II), e.g., 2,5-bis(diethylaminomethyl)-1,4-phenylenedipalladium(II) bis(2,4 - pentanedionate), or salts (III), e.g., 3,6-bis(diethylaminomethyl)-1,2-phenylenebis(pyridinepalladium(II)) $\mu$-chloride hexafluorophosphate, by reaction with a chelating agent, e.g., 2,4-pentanedione, or a cyclic amine, e.g., pyridine. The compounds are useful as components of precious-metal decorating compositions and as catalysts for polymerizing acetylene.

RELATED APPLICATION

This application is a continuation-in-part of my copending application Ser. No. 792,841, filed Jan. 21, 1969, now abandoned.

BACKGROUND OF THE INVENTION

(1) Field of the invention

This invention relates to, and has as its principal object provision of, new binuclear organo-palladium compounds. The products of the invention are bis(di-lower-alkylaminomethyl)phenylenedipalladium(II) compounds in which each palladium atom is ortho to a dialkylaminomethyl group and the benzene ring can contain up to two inert substituents.

(2) Relationship to the art

Heck, J. Am. Chem. Soc., 90, 313 (1968) discloses reaction of 2-(phenylazo)phenylpalladium(II) chloride with 2,4-pentanedione to give a solid product assigned the structure

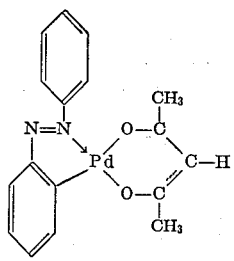

The azophenyl moiety that forms one ring with the palladium is disclosed as equivalent to a dimethylaminomethylphenyl moiety.

My above-mentioned application Ser. No. 792,841, of which this is a continuation-in-part, discloses aminoarylpalladium(II) chelates such as 2-dimethylaminomethylphenylpalladium(II) 2,4-pentanedionate. These compounds are mononuclear analogs of the products of Formula II of the present invention. In addition, Ser. No. 792,841 discloses aminoarylpalladium(II) halides as precursors of the foregoing chelates. The halides are the corresponding mononuclear analogs of products of Formula I of the present invention.

DESCRIPTION OF THE INVENTION

The new compounds of this invention, derived from substituted xylenes, include:

bis(di-lower-alkylaminomethyl)phenylenedipalladium(II) dichlorides and dibromides (I),
bis(-di-lower-alkylaminomethyl)phenylenedipalladium(II) dichelates (II), and
bis(di-lower-alkylaminomethyl)phenylenebis(diligandpalladium(II)) salts (III).

The formulas of these compounds are:

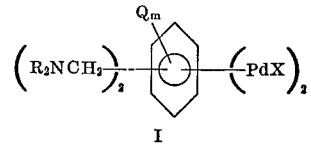

I

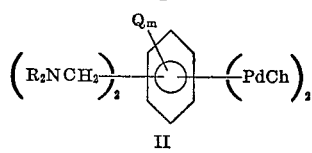

II

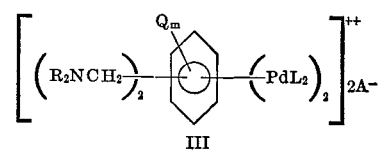

III

In the above formulas,

R is lower alkyl, i.e., an alkyl group of up to 8 carbons, further defined below;
Q is a monovalent substituent, further defined below; the subscript $m$ is 0, 1, or 2;
X is Cl or Br;
Ch is a monovalent, bidentate chelate ligand, further defined below;
L is a cyclic tertiary amine having aromatic properties, in which amine the amino nitrogen is intracyclic, defined further below; and
A is one equivalent of an anion, also further defined below.

A compound of Formula I, II or III can have any of five isomeric structures, depending on the relative positions of the dialkylaminomethyl groups, the palladium atoms, and the Q groups, if any, in the benzene ring. All such isomers, determined by the xylene isomers used as precursors, are included in the products of the invention. The various products can be represented by the formulas which follow. Inspection of these formulas shows that compounds of Formulas Ia and Ib are formed from bis (dialkylamino)-p-xylenes, those of Formulas Ic and Id, from bis(dialkylamino)-m-xylenes, and those of Formula Ie, from bis(dialkylamino)-o-xylenes.

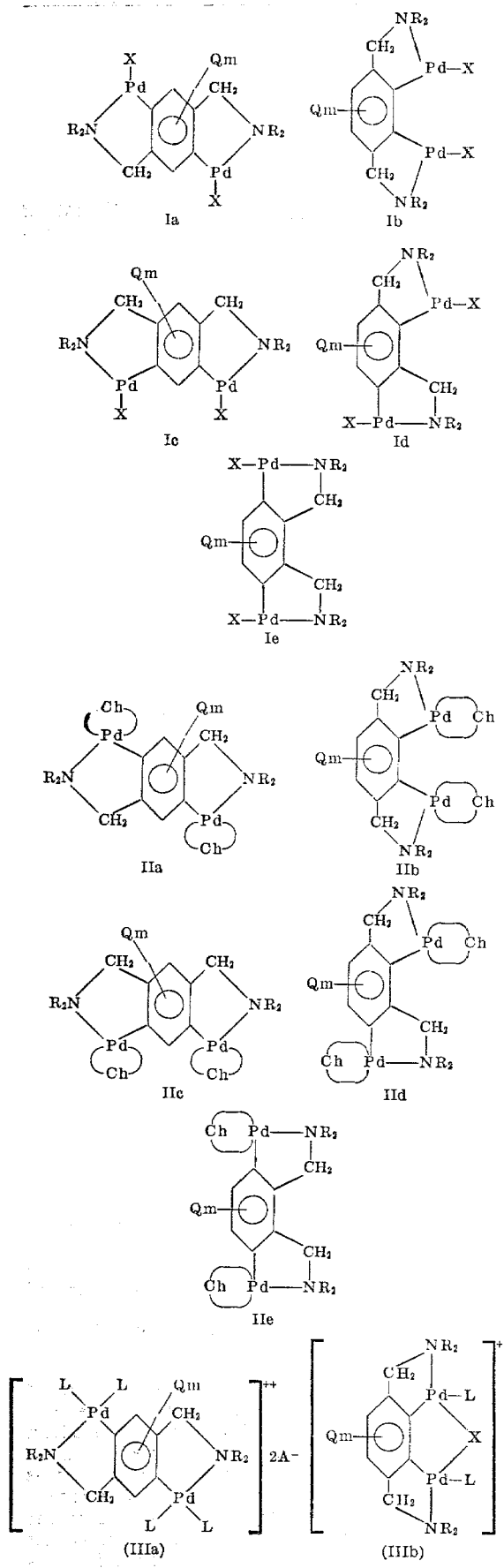

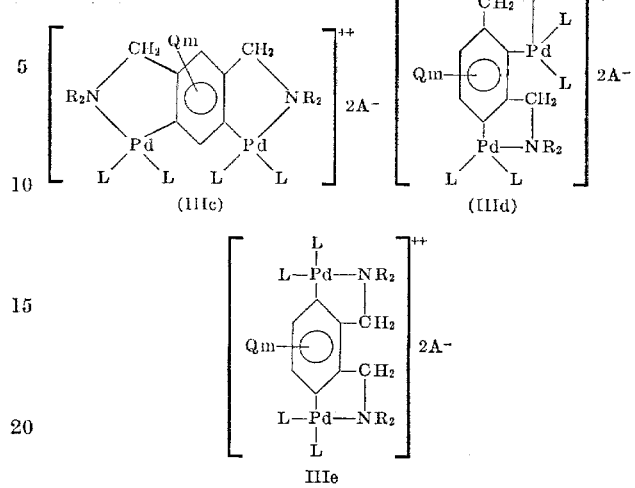

Because of ease of isolation, e.g., by chromatography, the preferred isomers for each type are those represented by Formulas a, b, c, and e, especially a, b and c.

In all the foregoing compounds each palladium atom has a formal valence (oxidation number) of two and a coordination number of four.

One of the two formal valences of each palladium atom is satisfied by the bond to a carbon of the benzene ring, and two of the four coordination sites of each palladium atom are satisfied by (1) the same bond to a carbon of the benzene ring and (2) the bond to the nitrogen of the adjacent dialkylaminomethyl group.

The remaining one formal valence and two coordination sites of each palladium atom are satisfied as follows:

In compounds of Formula I, the other formal valence is satisfied by the halogen X, and, since the compounds are polymeric in the solid state, the two other coordination sites are satisfied by halogen bridging. For example, in a compound of Formula Ia the repeating unit in the solid state has the formula

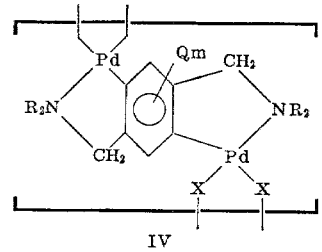

As is usual in inorganic and organo-inorganic chemistry, compounds of Formula I are represented, for convenience, by their monomeric formulas.

In compounds of Formula II, the second formal valence is satisfied by one of the two bonds to the chelate ligand Ch. The two other coordination sites are satisfied by this bond and by the second, "coordinate" bond to the same chelate ligand.

In compounds of Formula IIIa, c, d, and e, the second formal valence is satisfied by one of the anions A. The third and fourth coordination sites are satisfied by the two ligands L. In compounds of Formula IIIb, the second formal valences of the two palladium atoms are satisfied by the anion A and the bridging halogen X. One coordination site of each palladium atom is satisfied by L and one by the bridging halogen X.

In accordance with modern formulation, no distinction is made between covalent and coordinate bonds; aromatic ring systems, such as the benzene ring, the Pd-Ch chelate ring, and the aromatic rings represented by the ligand L, are depicted by "delocalized" formulas. For comparison, the classical formulas of the products of Examples 2 and 8 would be the following:

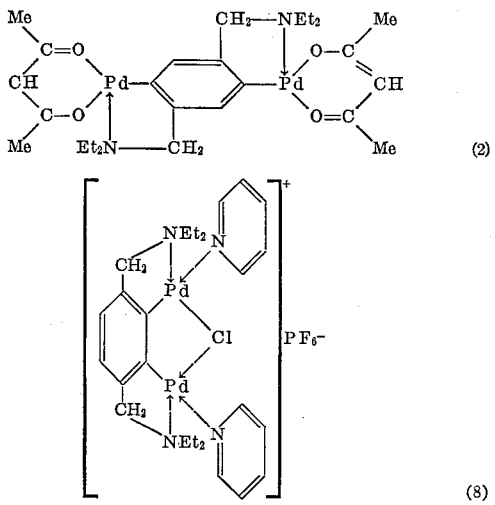

Preparation of the products.—Compounds of Formula I are prepared by the reaction of $Na_2PdCl_4$ or $Na_2PdBr_4$ with an $\alpha,\alpha'$-bis(dialkylamino)-o-, m-, or p-xylene in liquid phase and in the presence of a basic catalyst, e.g., a trialkylamine or an N-alkylalkylenimine. An illustrative equation for this reaction can be written as follows:

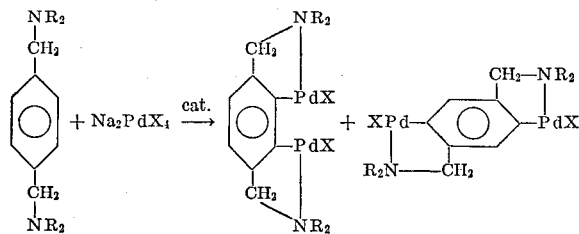

Ordinary temperatures usually suffice, although higher temperatures can be used. Methyl, ethyl, and propyl alcohols are suitable solvents, preferably diluted with about 5–10% wter. Operable palladium-containing reactants include also other alkali-metal salts containing the $PdX_4^=$ anion, salts of the type $M_2Pd_2X_6$, and (nitrile)$_2PdX_2$ complexes, where X is Cl or Br and M is an alkali metal.

The products of Formula II are prepared from those of Formula I by what are essentially well-known procedures. The preparation of metal chelates, in which one or more Ch groups as defined above are bonded to a metal, from metal halides and the parent Ch—H, is, in fact, widely reported. Various embodiments of the process are reviewed, for example, in "Inorganic Syntheses," vol. II, ed. Fernelius, pp. 10–20 ff. (McGraw-Hill, 1946) and vol. XI, ed. Jolly, pp. 72–82 ff. (1968). Preparations of individual metal chelates are scattered throughout the chemical literature, and references to some of these publications are given in "Inorganic Syntheses."

The palladium (II) chelates of Formula II can be prepared by reaction of a halide of Formula I with (a) a compound Ch—H in the presence of a base or (b) a preformed metal salt of a compound Ch—H, in which the H is replaced by one equivalent of a metal. The base can be, for example, a hydroxide, oxide, or carbonate of an alkali metal or it can be ammonia, a primary, secondary, or tertiary alkylamine, or a quaternary ammonium hydroxide. Both these methods are mentioned in "Inorganic Syntheses." If a preformed salt is used, it is usually an alkali-metal salt or a thallium salt.

In preparing the products of Formula II, it is convenient to use a solvent such as dimethylformamide or a di(lower alkyl)amide of a lower alkanecarboxylic acid. The products are usually soluble in such solvents, and thus the initial reaction mixture need not be homogeneous.

Compounds of Formula III can be prepared by reacting a compound of Formula I with an aromatic tertiary amine L, usually in excess. The primary product is a compound of Formula III in which A is X. Other values of A can be introduced by conventional anion-exchange processes, for example, precipitation with a large anion such as hexafluorophosphate, $PF_6^-$. Anions that do not give insoluble salts can be introduced by use of anion-exchange resins.

The scope of the products of the invention can be more clearly understood from the following discussion of the various terms in Formulas I, II and III.

The R groups.—R is lower alkyl, i.e., an alkyl group of up to 8 carbons. The two R groups attached to any one nitrogen atom can be the same or different but preferably are the same, because of ease of preparation of the intermediates. At least one of the two R groups bonded to a given nitrogen is primary, i.e., it is bonded to the nitrogen through a carbon bonded to at least two hydrogens. Examples of R are methyl, ethyl, propyl, isopropyl, sec-butyl, tert-pentyl, isohexyl, 2-ethylhexyl, and octyl.

The Q group.—Q can be primary or secondary lower alkyl, lower alkoxy, halo, nitro, cyano, or lower alkoxycarbonyl. Examples are methyl, isopropyl, sec-butyl, isopentyl, heptyl, ethoxy, isobutoxy, hexyloxy, fluoro, chloro, bromo, iodo, methoxycarbonyl, propoxycarbonyl, sec-butoxycarbonyl. When m is 2, the Q groups can be the same or different; preferably they are the same. Preferably, because of availability of intermediates, m is at most 1, and most preferably it is 0. Q groups are introduced into products of the invention by using as starting materials $\alpha,\alpha'$-bis(dialkylamino)xylenes bearing appropriate Q substituents.

The chelate ligand Ch.—Ch is a monovalent, bidentate chelate ligand formed by removal of an acidic hydrogen from a beta-diketone,
a beta-keto aldehyde,
a beta-keto ester,
a beta-hydrocarbylimino ketone,
a beta-hydrocarbylimino ester,
a beta-bis(hydrocarbylimino)alkane, or
a tropolone.

Beta-diketones, beta-keto aldehydes, beta-keto esters, beta-hydrocarbylimino ketones, beta-hydrocarbylimino esters, and beta-bis(hydrocarbylimino)alkanes are known compounds. The compounds of these structural types that can form monovalent bidentate chelate derivatives with metal ions by removal of one hydrogen per ligand, by processes discussed earlier, are well known to those skilled in the art. In general, any such compound in which the carbon between the two carbonyl carbons is bonded to at least one hydrogen and in which at most one of the carbonyl carbons is part of a ring will from chelates in this manner. The chelate portions of the molecules of the products of this invention can be derived from any such compounds. "Carbonyl carbon" as herein used means either of the carbon atoms bonded to carbonyl oxygen (=O) or a hydrocarbylimino group (=NR') (cf. Z in Formula V, below).

The preparation of beta-diketones and beta-keto aldehydes is described by Hauser et al. in Chapter 3 of "Organic Reactions," vol. VIII, edited by Adams et al. Similarly, the preparation of beta-keto esters is described by Hauser and Hudson in Chapter 9 of vol. I of "Organic Reactions" (Wiley, 1942). Beta-keto imines and their chelate-forming properties are discussed by Martin et al., J. Am. Chem. Soc., 83, 73 (1961), and in "Inorganic Syntheses," vol. XI, ed. Jolly, p. 72ff. (McGraw-Hill, 1968). Bis-hydrocarbylimino) derivatives of beta-diketones and their conversion to metal chelates are described by Parks and Holm, Inorg. Chem., 7, 1408 (1968).

Operable beta-dicarbonyl compounds and hydrocarbylimino derivatives thereof, CH—H, that can be used to form the chelate portion of the molecule include those of the formula

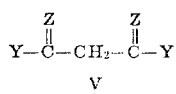

wherein:

Z is O or NR¹, R¹ being lower alkyl, aryl, or substituted aryl; the two Z groups in a given molecule can be the same or different; and preferably at most one Z is NR¹; and The Y groups in a single molecule are the same or different and are hydrogen, alkyl, cycloalkyl, lower fluoroalkyl, aryl, alkoxy, aryloxy, or aralkoxy, at most one of them being hydrogen, alkoxy, aryloxy, or aralkoxy. The aryl and heterocyclyl Y groups can contain inert substituents such as halo, lower alkyl, and lower alkoxy.

As is well known to those skilled in the art, the structure of the chelate ligand, Ch, formed by removal of a hydrogen from a chelate ligand precursor, CH—H, of formula V is, by modern methods of representation,

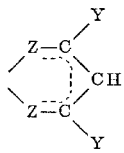

the bonds to the left of the Z groups being connected with the metal atom.

Examples are:

5-methyl-2,4-hexanedione,
7-methyl-2,4-nonanedione,
2,4-hexadecanedione,
1-phenyl-1,3-butanedione,
1-(p-tolyl)-1,3-butanedione,
1-(4-bromophenyl)-1,3-butanedione,
1-(m-anisyl)-1,3-butanedione,
1-(2,5-diethoxyphenyl)-1,3-pentanedione,
1-(2-hydroxyphenyl)-1,3-butanedione,
1-(5-chloro-2-hydroxy)phenyl-1,3-butanedione,
1-(1- and 2-naphthyl)-1,3-butanedione,
1-(1-hydroxy-2-naphthyl)-1,3-butanedione,
1,1,1-trifluoro-2,4-pentanedione,
1,1,1,5,5,5-hexafluoro-2,4-pentanedione,
3,5-heptanedione,
8-methyl-3,5-nonanedione,
4,6-nonanedione,
4-methyl-1-phenyl-1,3-pentanedione,
1-cyclohexyl-1,3-butanedione,
1-(1,2,2,3-tetramethylcyclopentyl)-3-phenyl-1,3-propanedione,
1-(2-naphthyl)-3-phenyl-1,3-propanedione,
3-oxobutanal,
5-methyl-3-oxohexanal,
4,4-dimethyl-3-oxopentanal,
3-oxo-3-(p-anisyl)propanal,
3-(5-chloro-2-hydroxyphenyl)-3-oxopropanol,
3-(1-naphthyl)-3-oxopropanal,
ethyl 3-oxobutanoate,
t-butyl 3-oxobutanoate,
phenyl 3-oxobutanoate,
benzyl 3-oxobutanoate,
ethyl 3-oxohexanoate,
ethyl 3-cyclohexyl-3-oxopropanoate,
methyl 3-oxo-3-phenylpropanoate,
ethyl 3-oxopentanoate,
ethyl 3-(p-anisyl)-3-oxopropanoate,
isobutyl 3-oxobutanoate,
4-phenylimino-2-pentanone,
4-(o-anisylimino)-2-pentanone,
4-(p-tolylimino)-2-pentanone,
4-(2,6-dimethylphenylimino)-2-pentanone,
4-(p-chlorophenylamino)-2-pentanone,
1-phenyl-3-phenylimino-1-butanone,
1,3-diphenyl-3-phenylimino-1-propanone,
4-phenylimino-2-butanone,
4-methylimino-2-pentanone ("enol" or "eneamine" form, 4-methylamino-3-penten-2-one),
ethyl 3-phenyliminobutanonate,
ethyl 3-(o-tolylimino)butanoate,
2-phenylamino-4-phenylimino-2-pentene,
2-(m-tolylamino)-4-tolylimino)-2-pentene, and
1-phenylamino-3-phenyliminopropene.

The last three compounds are named as the "enol" or "eneamine" isomers. The corresponding "keto" or "aneimine" isomer for, e.g., the first compound is 2,4-bis(phenylimino)pentane (cf. Formula V). Regardless of which isomer predominates in this or any other type of ligand precursor CH—H, the same metal chelate will be obtained.

The more readily available compounds of Formula V are those in which Y is alkyl of at most 12 carbons, cycloalkyl of 5 or 6 ring carbons, lower fluoroalkyl; aryl of at most 10 carbon and containing up to two substituents selected from halo, lower alkyl, lower alkoxy, and hydroxyl; hydrogen, lower alkoxy, aryloxy of up to 10 carbons, and aralkoxy of up to 10 carbons, at most one Y being hydrogen, alkoxy, aryloxy, or aralkoxy. Products of the invention in which the chelate portion contains such Y groups are therefore preferred. More preferably, Y is hydrogen, lower alkyl, cyclopentyl, cyclohexyl, trifluoromethyl, phenyl, naphthyl, lower alkoxy, phenoxy, or benzyloxy. Most preferably the chelate portion of the molecule is derived from a beta-diketone and Y is lower alkyl.

The more readily available hydrocarbylimino derivatives of beta-diketones, beta-keto aldehydes, and beta-keto esters, i.e., compounds of Formula V in which one Z is NR', the those in which R' is phenyl, optionally substituted with up to two inert substituents which can be lower alkyl, lower alkoxy, or halo, particularly chloro. These values of R' are therefore preferred in products of the invention of this type, and also in products in which both Z's are NR'. Most preferably R', when present, is phenyl. In addition, of the three types of beta-dicarbonyl compounds, beta-diketones form hydrocarbylimino derivatives most readily, and therefore when one Z is NR' in Formula V, the Y groups are preferably other than hydrogen, alkoxy, aryloxy, and aralkoxy.

Tropolones are described, for example, by Nozoe in Chapter VII of "Non-Benzenoid Aromatic Compounds," edited by Ginsburg (Academic Press, 1959). Formation of metal chelates by tropolones is discussed here and also by Bryant et al., J. Am. Chem. Soc., 75, 3784 (1953). Tropolones that are operable to produce chelating ligands, Ch, in the products of the present invention by loss of a hydrogen include tropolone itself and tropolones containing up to two or three inert substituents such as chloro, bromo, lower alkyl, and phenyl. In addition to tropolone, having the formula

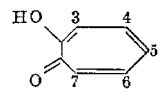

examples are 4-isopropyltropolone, 3-bromotropolone, 3,5,7-tribromotropolone, 3-bromo-7-methyltropolone, 5-methyltropolone, 5-chlorotropolone and 5-phenyltropolone. Preferably the number of substituents is 0 to 1.

The chelate ligand, Ch, formed by removal of the hydroxyl hydrogen from tropolone or a substituted tropolone will have the formula

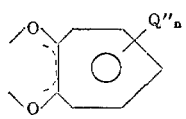

where Q" is chloro, bromo, lower alkyl, or phenyl, and $n$ is 0, 1, 2, or 3.

Because of availability of intermediates, ease of preparation, and stability of the palladium compounds, a preferred class of Ch ligands are those derived from beta-diketones, beta-keto esters, beta-hydrocarbylimino ketones, beta-bis(hydrocarbylimino)alkanes, and tropolones. Most preferred are ligands, Ch, derived from beta-diketones, beta-keto esters, beta-hydrocarbylimino ketones, and tropolones.

The ligand L.—Examples of L are pyridine, quinoline, isoquinoline, thiazole, benzothiazole, oxazole, benzoxazole, isothiazole, benzisothiazole, isoxazole, benzisoxazole, pyrazole, indazole, imidazole, benzimidazole, triazole, and benzotriazole, together with such compounds containing inert substituents such as lower alkyl, lower alkoxy, or halo. Preferably the molecule L will contain at most 2 such substituents. Examples of substituted ligands are 2-fluoropyridine, 3-bromopyridine, 4-chloropyridine, 3,5-dibromodipyridine, 3-chloro-4-ethoxypyridine, 5-ethyl-2-methylpyridine, 2-pentylpyridine, 2,4-dimethoxypyridine, 6-methoxy-4-methyl-quinoline, 3-ethylquinoline, 4-methylthiazole, 5-ethoxy-2-methylthiazole, and 2-hexyl-5-methoxyloxazole. Preferably L contains at most 12 carbons. More preferably it is a monocyclic compound, and most preferably it is unsubstituted.

The anion A.—The compounds of Formula III are essentially salts, the palladium-containing portion of which constitutes the cation. A is simply the requisite and corresponding anion and can be any anion having an oxidation potential of at most about 0.5.

Oxidation potential is a well-known property. It is discussed, for example, in Moeller, "Inorganic Chemistry" pages 284 ff. (Wiley, 1952), and in Lange's "Handbook of Chemistry," 10th edition, pages 1212 ff. Oxidation potential measures the relative ease with which a reductant in an electrode reaction is oxidized, i.e., its reducing power. A large number of oxidation potentials are tabulated in Moeller and in Lange, and also in U.S. Department of Commerce Document AD 617400, "Theory of Plating by Catalytic Chemical Reduction," by D. J. Levy.

A can be a relatively large anion which, when added to a solution containing a cation of Formula III, causes precipitation of a relatively insoluble salt. Examples of such anions are hexafluorophosphate (cf. Examples 8 and 16), hexafluoroarsenate, tetrachloroaurate, tetrachlorobismuthate, tetrachloroferrate, tribromomercurate, hexachlorophosphate, hexachloroplatinate, hexabromoantimonate, tetraphenylborate, perchlorate, reineckate, and picrate.

Alternatively, A can be a comon anion such as chloride, fluoride, bromide, iodide, nitrate, sulfate, or acetate.

EMBODIMENTS OF THE INVENTION

The following examples illustrate the products of the invention. Examples 1, 9, 12 (first part) and 13 disclose compounds of Formula I; 2–7, 11, 12 (second part), 14 and 15, Formula II; and 8 and 16, Formula III.

EXAMPLE 1

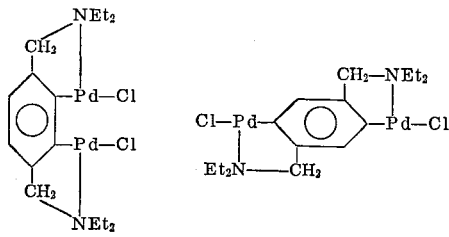

Et=C₂H₅

3,6-bis(diethylaminomethyl)-1,2 - phenylenedipalladium (II) dichloride and 2,5-bis(diethylaminomethyl) - 1,4-phenylenedipalladium(II) dichloride To 400 ml. of a 0.19 M solution of Na₂PdCl₄ in 95% aqueous methanol was added a mixture of 9.4 g. (0.038 mole) of α,α'-bis(diethylamino) - p - xylene and 12.8 g. (0.076 mole) of N-cyclohexylpiperidine. The reaction mixture was stirred overnight and was then filtered. The solid on the filter was purified by digestion with 400 ml. of hot methanol, followed by filtration and drying, to give 2,5-bis(diethylaminomethyl)-1,4 - phenylenedipalladium(II) dichloride. Dilution of the filtrate with water gave no precipitate. On extraction of the aqueous methanol solution with methylene chloride, the yellow color went into the methylene chloride.

Addition of water to the original, yellow filtrate gave a solid, which was separated by filtration. The filtrate was extracted with methylene chloride, the extract was combined with the methylene chloride extract of the preceding paragraph, and the solid was digested with the combined methylene chloride extracts and separated by filtration and dried, to give 6.2 g. of 3,6-bis(diethylaminomethyl)-1,2-phenylenedipalladium(II) dichloride.

*Analysis.*—Calcd for C₁₆H₂₆Cl₂N₂Pd₂ (percent): C, 36.3; H, 4.92; Cl, 13.4; N, 5.29; Pd, 40.1. Found (percent): C, 36.5; H, 4.90; Cl, 13.5; N, 5.03; Pd, 40.3.

NMR (CD₃CN): s 3.87, s 6.38, a broad m (~1.2 p.p.m.) centered around 7.5τ t (J=7.0 c.p.s.) at 8.78τ in 1:2:4:6 ratio, assigned to the equivalent aromatic H's, benzyl CH₂'s, nonequivalent ethyl CH₂'s, and ethyl CH₃'s.

Later experiments showed that the extraction with methylene chloride is not necessary.

The identity of the 2,5-, 1,4-isomer was confirmed by conversion of the compound to the products of Examples 2, 3, and 4.

If Na₂PdBr₄ is substituted for Na₂PdCl₄ in the foregoing example, the products are 3,6-bis(diethylaminomethyl) - 1,2 - phenylenedipalladium(II) dibromide and 2,5-bis(diethylaminomethyl)-1,4 - phenylenedipalladium(II) dibromide.

EXAMPLE 2

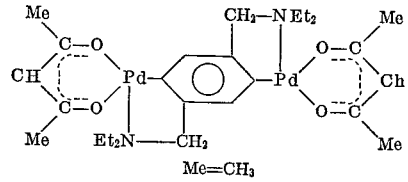

Me=CH₃

2,5-bis(diethylaminomethyl)-1,4-phenylenedipalladium-(II) bis(2,4-pentanedionate)

To a suspension of 10.6 g. (0.02 mole) of crude 2,5-bis(diethylaminomethyl)-1,4 - phenylenedipalladium(II) dichloride in 200 ml. of dimethylformamide was added 9 g. (0.09 mole) of 2,4-pentanedione and 12 g. (0.09 mole) of diisopropylethylamine. The reaction mixture was stirred at 50° C. for 1 hour. Attempted filtration proceeded very sluggishly, even after addition of activated charcoal and diatomaceous earth. Then entire mixture was diluted with water and extracted with methylene chloride, and the extracts were chromatographed on alumina. The pale yellow band was collected (methylene chloride), the eluate was stripped to dryness, and the residue was stirred with methanol and filtered. There was obtained 7.6 g. (58%) of creamy solid 2,5-bis(diethylaminomethyl)-1,4-phenylenedipalladium(II) bis(2,4 - pentanedionate) M.P. dec. 240–242° C. (after recrystallization from toluene-heptane).

*Analysis.*—Calcd for C₂₆H₄₀N₂O₄Pd₂ (percent): C, 47.6; H, 6.10; N, 4.27. Found (percent): C, 47.5; H, 6.18; N, 4.35.

The NMR spectrum agreed with the above structure: s 3.07, s 4.66, s 6.00 m (2 overlapping quadruplets) 7.03, s 7.96, s 8.05, and t (J=7.0) 8.47τ in 1:1:2:4:3:3:6 ratio. They were assigned to aromatic H's, pentanedionate ring H's, benzyl CH₂, ethyl CH₂, two pentanedionate methyls and ethyl group methyls.

If 4-phenylimino-2-pentanone is substituted for 2,4-pentanedione in essentially the procedure of the foregoing example, the product is 2,5-bis(diethylaminomethyl) - 1,4 - phenylenedipalladium(II) bis(4 - phenylimino-2-pentanonate). With ethyl 3-oxobutanoate as the chelate ligand source, the product is 2,5-bis(diethylaminomethyl)-1,4-phenylenedipalladium(II) bis(ethyl 3 - oxobutanoate).

EXAMPLE 3

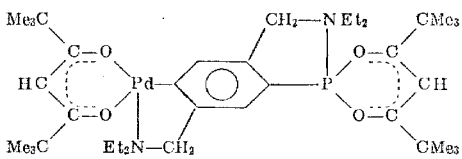

2,5-bis(diethylaminomethyl)-1,4 - phenylenedipalladium-(II) bis(2,2,6,6-tetramethylheptane-3,5-dionate)

A mixture of 10.6 g. (0.002 mole) of 2,5-bis(diethylaminomethyl)-1,4 - phenylenedipalladium(II) dichloride, 0.06 mole of 2,2,6,6-tetramethyl-3,5-heptanedione, and 0.06 mole of diisopropylethylamine was stirred in 200 ml. of dimethylformamide for one hour. 2,5-bis(diethylaminomethyl)-1,4 - phenylenedipalladium(II) bis(2,2,6,6-tetramethylheptane-3,5-dionate was obtained, after isolation by essentially the procedure of Example 12 (two chromatographings) in 1.4 g. (8.6%) yield. It was recrystallized from toluene-hexane.

*Analysis.*—Calcd for $C_{38}H_{64}N_2O_4Pd_2$ (percent): C, 55.4; H, 7.79; N, 3.40. Found (percent): C, 55.4; H, 8.09; N, 3.41.

When thallium 2,2,6,6-tetramethyl-3,5-heptanedionate was substituted for the free diketone and diisopropylethylamine, the yield was 35%. The product was recrystallized from toluene-ethanol; M.P. 255–256° C. dec.

EXAMPLE 4

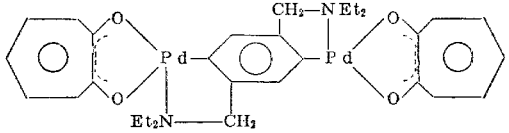

2,5 - bis(diethylaminomethyl) - 1,4 - phenylenedipalladium(II) ditropolonate

A mixture of 5.3 g. (0.01 mole) of 2,5-bis(diethylaminomethyl)-1,4 - phenylenedipalladium(II) dichloride, 80 ml. of dimethylformamide, 3.6 g. (0.03 mole) of tropolone, and 3.8 g. (0.03 mole) of diisopropylethylamine was stirred and heated up to 80° C. The mixture was filtered without cooling, and the solid on the filter was washed with dimethylformamide and methanol and dried. Additional product was obtained by diluting the filtrate with water. The yield of combined and dried 2,5-bis(diethylaminomethyl)-1,4-phenylenedipalladium(II) ditropolonate was 4.2 g. (60%), M.P. 185–187° C.

*Analysis.*—Calcd. for $C_{30}H_{36}N_2O_4Pd$ (percent): C, 51.4; H, 5.14; N, 4.00. Found (percent): C, 51.2; H, 5.28; N, 4.08.

EXAMPLE 5

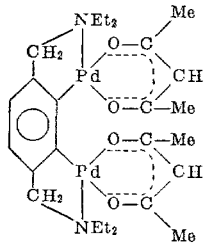

3,6 - bis(diethylaminomethyl) - 1,2 - phenylenedipalladium(II) bis(2,4-pentanedionate)

A mixture of 1.1 g. of 3,6-bis(diethylaminomethyl)-1,2-phenylenedipalladium(II) dichloride, 2 ml. of 2,4-pentanedione, and 3.6 ml. of diisopropylethylamine was briefly refluxed in 15 ml. of dimethylformamide and poured into 100 ml. of ice water. The mixture was extracted with methylene chloride. The extracts were washed with water and evaporated and the residue was stirred with methanol and filtered, to give 1.2 g. (88%) of 3,6-bis(diethylaminomethyl)-1,2-phenylenedipalladium(II) bis(2,4 - pentanedionate). Another sample, prepared by essentially the same method, was purified for analysis by recrystallization from heptane; M.P. 195–197° C.

*Analysis.*—Calcd for $C_{26}H_{40}N_2O_4Pd_2$ (percent): C, 47.6; H, 6.10; N, 4.27. Mol. wt. 656. Found (percent): C, 47.2; H, 6.36; N, 4.28. Mol. wt. 661 by VPO (vapor pressure osmometry) in chloroform at 37° C.

EXAMPLE 6

3,6 - bis(diethylaminomethyl) - 1,2-phenylenedipalladium-(II) bis(2,2,6,6 - tetramethyl-3,5-heptanedionate)

To 20 ml. of dimethylformamide was added 1.1 g. (0.002 mole) of 3,6-bis(diethylaminomethyl)-1,2-phenylenedipalladium(II) dichloride, 1.2 g. (0.006 mole) of 2,2,6,6-tetramethyl-3,5-heptanedione, and 0.8 g. (0.006 mole) of diisopropylethylamine. After being stirred overnight at room temperature, the yellow solution was poured into 100 ml. water and the mixture was extracted with methylene chloride. The extracts were washed three times with water and stripped, and the residual solid was washed with methanol and dried, to give 1.5 g. (two crops: 94%) of yellow 3,6-bis(diethylaminomethyl)-1,2-phenylenedipalladium(II) bis(2,2,6,6 - tetramethyl - 3,5 - heptanedionate), M.P. dec. 204–205° C. with prior darkening from about 190° C. The product was recrystallized from heptane.

*Analysis.*—Calcd for $C_{30}H_{64}N_2O_4Pd_2$ (percent): C, 55.4; H, 7.79; N, 3.40; Pd, 25.7. Found (percent): C, 55.4; H, 8.29; N, 3.46; Pd, 25.1.

NMR (CDCl$_3$): s 3.40, s 4.53, d (J=13.5) 5.20; d (J=13) 6.60; m~6.7, m~7.4, t (J=7) 8.68; s 8.78, s 8.96τ in 1:1:1:1:2:2:6:9:9 ratio.

EXAMPLE 7

3,6 - bis(diethylaminomethyl) - 1,2-phenyenedipalladium-(II) ditropolonate

A mixture of 2.65 g. of 3,6-bis(diethylaminomethyl)-1,2-phenylenedipalladium(II) dichloride (0.005 mole), in 40 ml. of dimethylforamide was stirred with 1.8 g. (0.015 mole) of tropolone and 1.9 g. of diisopropylethylamine at 50° C. for 30 min. A clear yellow solution resulted. Upon addition of water, a yellow solid precipitated. It was taken up in methylene chloride, and the extracts were dried, filtered, and stripped. 3,6-bis(diethylaminomethyl)-1,2-phenylenedipalladium(II) ditropolonate was obtained in 3.1 g. (88%) yield. It was recrystallized by adding a concentrated methylene chloride solution to heptane and boiling off methylene chloride; M.P. 184–185° C.

*Analysis.*—Calcd for $C_{30}H_{36}N_2O_4Pd_2$ (percent): C, 51.4; H, 5.14; N, 4.00. Found (percent): C, 51.1; H, 5.23; N, 3.98.

NMR: s 2.98, d (J=1.4) 3.08, s 3.39, complex n 3.5, s 5.92, q (J=7.0) 6.97, t (J=7.0) 8.35 in 2:2:1:1:2:4:6 ratio.

EXAMPLE 8

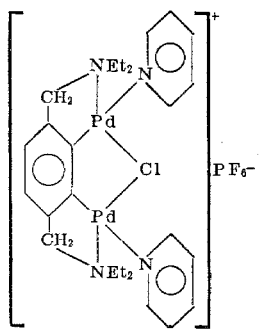

3,6-bis(diethylaminomethyl)-1,2-phenylenebis(pyridine-palladium(II) μ-chloride hexafluorophosphate A small sample of 3,6-bis(diethylaminomethyl-1,2-phenylenedipalladium(II) dichloride was stirred with excess aqueous pyridine. To the resulting solution was added excess $NH_4PF_6$. The precipitate was extracted with methylene chloride and purified by chromatography on alumina, washing with methanol and ether, and drying, to give yellow crystals of 3,6-bis(diethylaminomethyl)-1,2-phenylenebis(pyridinepalladium(II)) μ-chloride hexafluorophosphate.

*Analysis.*—Calcd for $C_{26}H_{36}ClF_6N_4PPd$ (percent): C, 39.2; H, 4.52; Cl, 4.45; F, 14.3; N, 7.03; Pd, 26.6. Found (percent): C, 39.2; H, 4.64; Cl, 3.88; F, 14.9; N, 7.00; Pd, 26.7.

NMR ($CD_3CN$): m 1.75, m 2.6, m 3.0, s 3.80; s 6.31, m (2 overlapping quadruplets) 7.6 and t (J=7.0) 8.82τ in 2:1:2:2:4:6 ratio, assigned to pyridine α-H's, pyridine γ-H's, pyridine β-H's, phenyl H's, benzyl $CH_2$, ethyl $CH_2$, and ethyl $CH_3$, respectively.

If sodium tetrachloroaurate, $NaAuCl_4 \cdot 2H_2O$, is substituted for $NH_4PF_6$ in the foregoing procedure, the product is 3,6-bis(diethylaminomethyl)-1,2-phenylenebis(pyridinepalladium(II)) μ-chloride tetrachloroaurate. If a solution of either of these products is passed through the nitrate form of an anion-exchange resin, 3,6-dis(diethylaminomethyl) - 1,2-phenylenebis(pyridinepalladium(II)) μ-chloride nitrate is obtained.

EXAMPLE 9

3,6 - bis(dipropylaminomethyl) - 1,2 - phenylenedipalladium(II) dichloride and 2,5-bis(dipropylaminomethyl)-1,4-phenylenedipalladium(II) dichloride To 500 ml. of a 0.19 M methanolic solution of $Na_2PdCl_4$ was added 14.4 g. (.048 mole) of α,α′-bis(diproylamino)-p-xylene and 12.3 g. (0.095 mole) of diisopropylamine. After five hours the mixture was filtered and the solid was washed with water and methanol. It was then stirred with 400 ml. of methylene chloride, filtered, washed with some more methylene chloride, and dried, to give 4.0 g. (14% yield) of 2,5-bis(dipropylaminomethyl)-1,4-phenylenedipalladium(II) dichloride.

The filtrates were combined, stirred with more water, and extracted with methylene chloride. The extracts were stripped to dryness, and the residue was stirred with acetone, filtered, and dried, yielding 20.7 g. (74%) of 3,6-bis(dipropylaminomethyl) - 1,2 - phenylenedipalladium-(II) dichloride.

The identities of the two products were confirmed by their conversion to the products of Examples 10 and 11.

EXAMPLE 10

2,5-bis(dipropylaminoethyl)-1,4-phenylenedipalladium-(II) bis(2,2,6,6-tetramethyl-3,5-heptanedionate)

A mixture of 3 g. (0.005 mole) of 2,5-bis(dipropylaminomethyl) - 1,4 - phenylenedipalladium(II) dichloride and 6 g. (0.011 mole) of thallium 2,2,6,6-tetramethyl-3,5-heptanedionate was stirred at 50–60° C. for 2 min. in 70 ml. of dimethylformamide. The product was isolated by dilution of the reaction mixture with water, extracting with methylene chloride, chromatographing on alumina, and triturating with methanol. 2,5-bis(dispropylaminoethyl)-1,4-phenylenedipalladium bis(2,2,6,6 - tetramethyl-3,5-pentanedionate) was obtained in 68% yield and was recrystallized from toluene ethanol; M.P. 247–248° C. dec.

*Analysis.*—Calcd. for $C_{42}H_{72}N_2O_4Pd_2$ (percent): C, 57.3; H, 8.18; N, 3.18. Found (percent): C, 57.6; H, 8.12; N, 3.16.

NMR: s 3.08, s 4.39, s 6.02, m ~7.2, m ~7.8, s 8.79, s 8.87, and t (J=7.0) 9.09τ in 1:1:2:4:4:9:9:6 ratio.

EXAMPLE 11

3,6 - bis(dipropylaminomethyl)-1,2-phenylenedipalladium(II) bis(2,2,6,6-tetramethyl - 3,5 - heptanedionate The procedure of Example 10 was essentially repeated except that 3,6-bis(dipropylaminomethyl)-1,2-phenylenedipalladium(II) dichloride was used instead of the 2,5,-1,4- isomer. 3,6-bis(dipropylaminomethyl)-1,2-phenylenedipalladium(II) bis(2,2,6,6-tetramethyl - 3,5-heptanedionate) was obtained in 65% yield (2.9 g.; two crops) as yellow crystals, M.P. 185–186° C.

*Analysis.*—Calcd. for $C_{44}H_{72}N_2O_4Pd_2$ (percent): C, 57.3; H, 8.18; N, 3.18. Found (percent): C, 57.7; H, 8.07; N, 2.84.

NMR: s 3.41, s 4.52, d (J=13) 5.18, d (J=13) 6.47, m 6.5–8.6, s 8.75 and s 8.92 and t (J=7.0) 9.07τ in 1:1:1:1:8:9:9:6 ratio.

EXAMPLE 12

2,5-bis(dimethylaminomethyl)-1,4-phenylenedipalladium(II) bis(2,4-pentanedionate)

2,5-bis(dimethylaminomethyl) - 1,4 - phenylenedipalladium(II) dichloride was prepared by stirring 400 ml. of 0.19 M $Na_2PdCl_4$ with 7.3 g. (0.038 mole) of α,α′-bis-(dimethylamino)-p-xylene and 9.8 g. (0.076 mole) of diisopropylethylamine overnight, separating the solid by filtration, washing, and drying. The solid was stirred overnight in dimethylformamide with 9 g. of 2,4-pentanedione and 12 g. of diisopropylethylamine. The mixture was diluted with water and the product was extracted with methylene chloride and purified by chromatography on alumina. Stripping of the fraction eluted with methylene chloride and acetone, followed by trituration with methanol, filtration and drying gave 7.1 g. (31% overall) of off-white 2,5 - bis(dimethylaminomethyl)-1,4-phenylenedipalladium(II) bis(2,4-pentanedionate), which was recrystallized from xylene. It darkened gradually above about 220° C.

*Analysis.*—Calcd. for $C_{22}H_{32}N_2O_4Pd_2$ (percent): C, 44.0; H, 5.33 ;N, 4.67. Found (percent): C, 43.2; H, 5.37; N, 4.63.

NMR ($CDCl_3$): singlets at 3.07, 4.65, 6.03, 7.13, 7.97, and 8.02τ in 1:1:2:6:3:3 ratio assigned to aromatic H's, petanedionate CH, benzylic —$CH_2$, $N(CH_3)_2$, and pentanedionate $CH_3$.

EXAMPLE 13

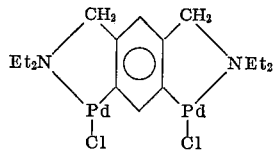

4,6-bis(diethylaminomethyl)-1,3-phenylenedipalladium(II)dichloride

To 400 ml. of 0.19 M $Na_2PdCl_4$ solution was added 9.45 g. (0.038 mole) of α,α′-bis(diethylamino)-m-xylene and 9.82 g. (0.076 mole) of diisopropylethylamine. The reaction mixture was stirred at room temperature for 6 hours and was then filtered. The solid was washed with water and methanol and was air-dried overnight, to give 4,6-bis(diethylaminomethyl) - 1,3 - phenylenedipalladium(II) dichloride. The structure of the product was confirmed by its conversion to the products of Examples 14, 15, and 16.

A small amount of the isomeric 2,6-bis(diethylaminomethyl) - 1,3 - phenylenedipalladium(II) dichloride is also formed in the foregoing procedure.

If α,α′ - bis(diethylamino) - o - xylene is substituted for the meta isomer in the foregoing example, the product is 5,6 - bis(diethylaminomethyl) - 1,4 - dipalladium(II) dichloride.

EXAMPLE 14

4,6-bis(diethylaminomethyl)-1,3-phenylenedipalladium(II) bis(2,4-pentanedionate)

A mixture of 10.6 g. (0.02 mole) of 4,6 - bis(diethylaminomethyl) - 1,3 - phenylenedipalladium(II) dichloride, 6 g. (0.06 mole) of 2,4-pentanedione, and 7.7 g. (0.06 mole) of diisopropylethylamine was stirred at 50° C. for one hour. The mixture was diluted with 400 ml. of water. The product was extracted with methylene chloride and purified by chromatography on alumina, eluting with methylene chloride and then with acetone. After evaporation of the solvents, the residual solid was taken up in 100 ml. of methylene chloride, the mixture was treated with activated charcoal and filtered, and the filtrate was evaporated. The evaporation residue was stirred with methanol and filtered yielding 4.7 g. (two crops; 37%) of pale creamy 4,6-bis(diethylaminomethyl) - 1,3 - phenylenedipalladium(II) bis(2,4-pentanedionate), M.P. dec. about 230° C. with prior darkening at about 200° C.

*Analysis.*—Calcd for $C_{26}H_{40}N_2O_2Pd$ (percent): C, 47.6; H, 6.10; N, 4.27; Pd, 32.3. Mol wt. 656. Found (percent): C, 47.7; H, 6.07; N, 4.31; Pd, 31.3. Mol wt. (by VPO in $CHCl_3$ at 37° C.): 662.

The NMR spectrum was in excellent agreement with the stated structure, exhibiting singlets at 2.75, 3.43, 4.71, 6.12, m (2 overlapping quadruplets) 7.1, s 8.00, s 8.09, t (J=7) 8.50τ in the correct 1:1:2:4:8:6:6:12 ratio. They were assigned to aromatic 2H, aromatic 5H, acetylacetonate H's, benzyl $CH_2$, ethyl $CH_2$, two acetylacetonate acetyls and ethyl group methyls.

EXAMPLE 15

4,6-bis(diethylaminomethyl)-1,3-phenylenedipalladium(II) ditropolonate

The procedure of Example 4 was essentially repeated, except that 4,6 - bis(diethylaminomethyl) - 1,3 - phenylenedipalladium(II) dichloride was used in place of the 2,5-, 1,4- isomer. 4,6 - bis(diethylaminomethyl) - 1,3- phenylenedipalladium(II) ditropolonate was obtained in 66% yield as a yellow solid. A separate sample, prepared by essentially the same method, was recrystallized from toluene for analysis; fibrous needles, M.P. 236–238° C.

*Analysis.*—Calcd for $C_{30}H_{36}N_2O_4Pd_2$ (percent): C, 51.4; H, 5.14; N, 4.00. Found (percent): C, 53.2; H, 5.44; N, 3.77.

The NMR spectrum had m 2.5–2.8, m 2.8–3.3, s 3.38, s 6.05, q (7.0) 6.95, t (7.0) 8.42τ in 5:1:1:2:4:6 ratio.

EXAMPLE 16

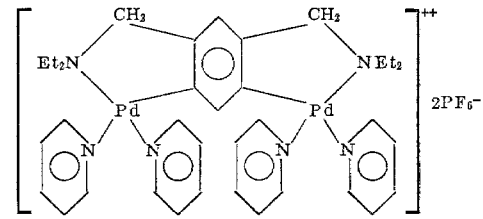

4,6-bis(dimethylaminomethyl)-1,3-phenylenebis(dipyridinepalladium(II)) bis(hexafluorophosphate)

A solution of 400 ml. of 0.19 M $Na_2PdCl_4$ was stirred with 18.9 g. (0.036 mole) of α,α'-bis(diethylaminomethyl)-m-xylene and 9.8 g. (0.076 mole) of diisopropylethylamine for 3 days at room temperature. To the dark suspension, which contained 4,6-bis(diethylaminomethyl)-1,3 - phenylenedipalladium(II) dichloride, 20 ml. of pyridine was added, along with two spoonfuls of activated charcoal. The mixture was filtered into 1200 ml. water containing 0.15 mole $NH_4PF_6$. The precipitated solid was dissolved in methylene chloride and chromatographed on alumina, eluting first with methylene chloride, then with acetone. The eluate was evaporated to dryness in vacuo. The residue was dissolved in about 40 ml. of acetone and, while still hot, diluted to 500 ml. with ethyl acetate. The precipitated crystalline solid was filtered and washed with ethyl acetate and ether. After air-drying there was obtained 28.2 g. (74%) of white crystalline 4,6-bis(diethylaminomethyl) - 1,3 - phenylenebis(dipyridinepalladium(II)) bis hexafluorophosphate, M.P. 205–208° C. dec. Analysis was carried out on another sample prepared by essentially the foregoing method.

*Analysis.*—Calcd for $C_{36}H_{46}F_{12}N_6P_2Pd_2$ (percent): C, 40.6; H, 4.33; F, 21.5; N, 7.91; Pd, 20.0. Found (percent): C, 40.3; H, 4.37; F, 22.3; N, 7.71; Pd, 21.7.

The NMR spectrum was in accord with the above structure displaying the following peaks: m 1.8 (8 H's, 2,6-py), t (J=8) 2.6τ (4 H's, 4-py); m 3.1τ (8 H's, 3,5-py); s 3.68τ (1 H, 2-arom.); s 5.80τ (1 H, 4-arom.); s 6.35 (4 H's, benzyl $CH_2$); m (2 overlapping quads) 7.6τ (8 H's, ethyl $CH_2$); t (J=7) 8.90τ (12 H's, ethyl $CH_3$).

If 5 - ethyl - 2 - methylpyridine is substituted for pyridine in the foregoing procedure, the product is 4,6-bis(diethylaminomethyl)-1,3-phenylenebis[bis(5 - ethyl-2-methylpyridine)palladium(II)] bishexafluorophosphate. With thiazole, 4,6-bis(diethylaminomethyl)-1,3-phenylene - bis(dithiazolepalladium(II)) bishexafluorophosphate is obtained. With isoxazole, the product will be 4,6-bis-(diethylaminomethyl) - 1,3 - phenylenebis(diisoxazolepalladium(II))bishexafluorophosphate.

Other examples of products of the invention are:

2-butyl-4,6-bis(diethylaminomethyl)-1,3-phenylenedipalladium(II) dibromide
3,6-bis(dioctylaminomethyl)-1,2-phenylenedipalladium-(II) dichloride
3,6-bis(dimethylaminomethyl)-2,5-diisopentyloxy-1,4-phenylenedipalladium(II) dibromide
4,6-bis(dipropylaminomethyl)-2-ethoxycarbonyl-1,3-phenylenedipalladium(II) dichloride
5-chloro-4,6-bis(dibutylaminomethyl)-1,3-phenylenedipalladium(II) ditropolonate
4,6-bis(diethylaminomethyl)-1,2-phenylenedipalladium-(II) bis[(m-tolylamino)-4-(m-tolylimino)pentenate]
4,6-bis(dipropylaminomethyl)-2-nitro-1,3-phenylenedipalladium(II) bis(5-methyl-2,4-hexanedionate)
4-chloro-3,6-bis(diethylaminomethyl)-1,2-phenylenebis-(pyridinepalladium(II))μ-bromide hexafluorophosphate
2,6-bis(dimethylaminomethyl)-1,4-phenylenebis[bis-(3-methylpyridine)palladium(II))]bis(hexafluoroarsenate).

UTILITY

Products of Formula I are useful as intermediates in the preparation of products of Formulas II and III. All the compounds are useful as components of preciousmetal decorating compositions. Although the compounds of Formula II are the best for this use because of their relatively good solubility in organic solvents, the relatively less soluble products of types I and III can be applied as dispersions in adhesive binders. All the compounds are also useful as catalysts for organic reactions, particularly the polymerization of acetylene. The latter two utilities are shown below.

As noted, products of Formula II are particularly useful as components of precious-metal decorating compositions because of their good solubility in organic solvents. For example, a decorating composition comprising a palladium compound of Formula II, a gold compound, a flux, a solvent, a viscosifying agent, and a dye can be painted on the substrate to be decorated, and the substrate can then be fired at about 500–800° C. to give an attractive metal coating. Such compositions and procedures are well known to those skilled in the art. They are described, for example, in U.S. Pat. 3,216,834, in which bis(dialkylsulfide)palladium(II) dichlorides are used as the palladium source. The palladium compounds of Formula II of the present invention have higher palladium contents than their counterparts of my application Ser. No. 792,841 since they contain two palladium atoms bonded to each benzene ring rather than one per ring.

As shown by the following examples, products of Formulas II and III are also useful as catalysts, particularly for the polymerization of acetylene. Polyacetylenes, especially those of relatively low molecular weight illustrated in Example B, are useful as components of drying-oil systems and as absorbers of ultraviolet radiation, as stated in French Pat. 1,283,869.

EXAMPLE A

In an atmosphere of nitrogen, a glass ampoule was charged with 0.11 g. of 3,6-bis(diethylaminomethyl)-1,2-phenylene-dipalladium(II) dichloride and 10 ml. of o-dichlorobenzene and sealed. The sealed ampoule was placed in a shaker tube, which was evacuated, flushed with nitrogen, evacuated again, closed, cooled, and cold-pressured with 20.0 g. of acetylene. The shaker tube was heated at 200° C. for 8 hours with shaking. The ampoule broke, and its contents were released to the tube, at the start of the shaking period. During the 8 hours the pressure fell from 380 p.s.i. to 0 p.s.i., corresponding to a complete reaction of the acetylene. After the tube was cooled, vented, and opened, it was found that all the acetylene had been converted to polyacetylene.

EXAMPLE B

By essentially the procedure of Example A, 2.0 g. of acetylene, 0.11 g. of 3,6-bis(diethylaminomethyl)-1,2-phenylenebis(pyridinepalladium(II))$\mu$ - chloride hexafluorophosphate (cf. Example 8), and 10 ml. of o-dichlorobenzene were heated at 200° C. for 8 hours in a closed system under autogenous pressure. During this time, the acetylene was completely converted to a polyacetylene that was soluble in o-dichlorobenzene.

Since obvious modifications and equivalents will be evident to those skilled in the chemical arts, I propose to be bound solely by the appended claims.

The embodiments of the invention in which an exclusive property or privilege is claimed are defined as follows:

1. A compound of the formula

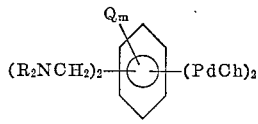

wherein
the R's, alike or different, are lower alkyl;
Q is primary or secondary lower alkyl, lower alkoxy, halo, nitro, cyano or lower alkoxycarbonyl;
the subscript $m$ is 0, 1 or 2;
and Ch is a monovalent, bidentate chelate ligand formed by removal of an acidic hydrogen from a compound selected from the group consisting of:

(A) 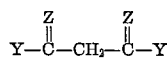

wherein:
Z, alike or different, is O or $NR^1$, $R^1$ being lower alkyl, phenyl, or phenyl substituted with up to two lower alkyl, lower alkoxy or halo groups;
Y, alike or different, is H, alkyl of up to 12 carbons, cycloalkyl of 5 to 6 ring carbons, lower fluoroalkyl, lower alkoxy, aryloxy of up to 10 carbons, aralkoxy of up to 10 carbons, aryl of up to 10 carbons, and such aryl containing up to two halo, lower alkyl, lower alkoxy or hydroxyl groups, with the proviso that at most one Y is hydrogen, alkoxy, aryloxy or aralkoxy; and (B) 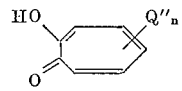

wherein:
Q'' is chloro, bromo, lower alkyl, or phenyl, and
$n$ is 0, 1, 2 or 3.

2. The compound of claim 1 named 2,5-bis(diethylaminomethyl) - 1,4 - phenylenedipalladium(II) bis(2,4-pentanedionate).

3. The compound of claim 1 named 2,5-bis(diethylaminomethyl) - 1,4 - phenylenedipalladium(II) bis(2,2,6,6-tetramethylheptane-3,5-dionate).

4. The compound of claim 1 named 2,5-bis(diethylaminomethyl) - 1,4 - phenylenedipalladium(II)ditropolonate.

5. The compound of claim 1 named 3,6-bis(diethylaminomethyl) - 1,2 - phenylenedipalladium(II) bis(2,4-pentanedionate).

6. The compound of claim 1 named 3,6-bis(diethylaminomethyl)-1,2-phenylenedipalladium(II) bis(2,2,6,6-tetramethyl-3,5-heptanedionate).

7. The compound of claim 1 named 3,6-bis(diethylaminomethyl) - 1,2-phenylenedipalladium(II) ditropolonate.

8. The compound of claim 1 named 2,5-bis(dipropylaminomethyl)-1,4-phenylenedipalladium(II) bis(2,2,6,6-tetramethyl-3,5-heptanedionate).

9. The compound of claim 1 named 3,6-bis(dipropylaminomethyl)-1,2-phenylenedipalladium(II) bis(2,2,6,6-tetramethyl-3,5-heptanedionate).

10. The compound of claim 1 named 2,5-bis(dimethylaminomethyl) - 1,4 - phenylenedipalladium(II) bis(2,4-pentanedionate).

11. The compound of claim 1 named 4,6-bis(diethylaminomethyl) - 1,3 - phenylenedipalladium(II) bis(2,4-pentanedionate).

12. The compound of claim 1 named 4,6-bis(diethylaminomethyl) - 1,3 - phenylenedipalladium(II) ditropolonate.

References Cited

Heck: Journ. Amer. Chem. Soc., vol. 90, pp. 313–317, 1968.

ALEX MAZEL, Primary Examiner

J. H. TURNIPSEED, Assistant Examiner

U.S. Cl. X.R.

106—1; 117—33.3, 35, 130, 131; 252—430, 431, 472; 260—145, 242, 260, 299, 319.1